April 29, 1924.
F. J. PRINDIVILLE
BOND VALUE CHART
Filed April 11, 1922
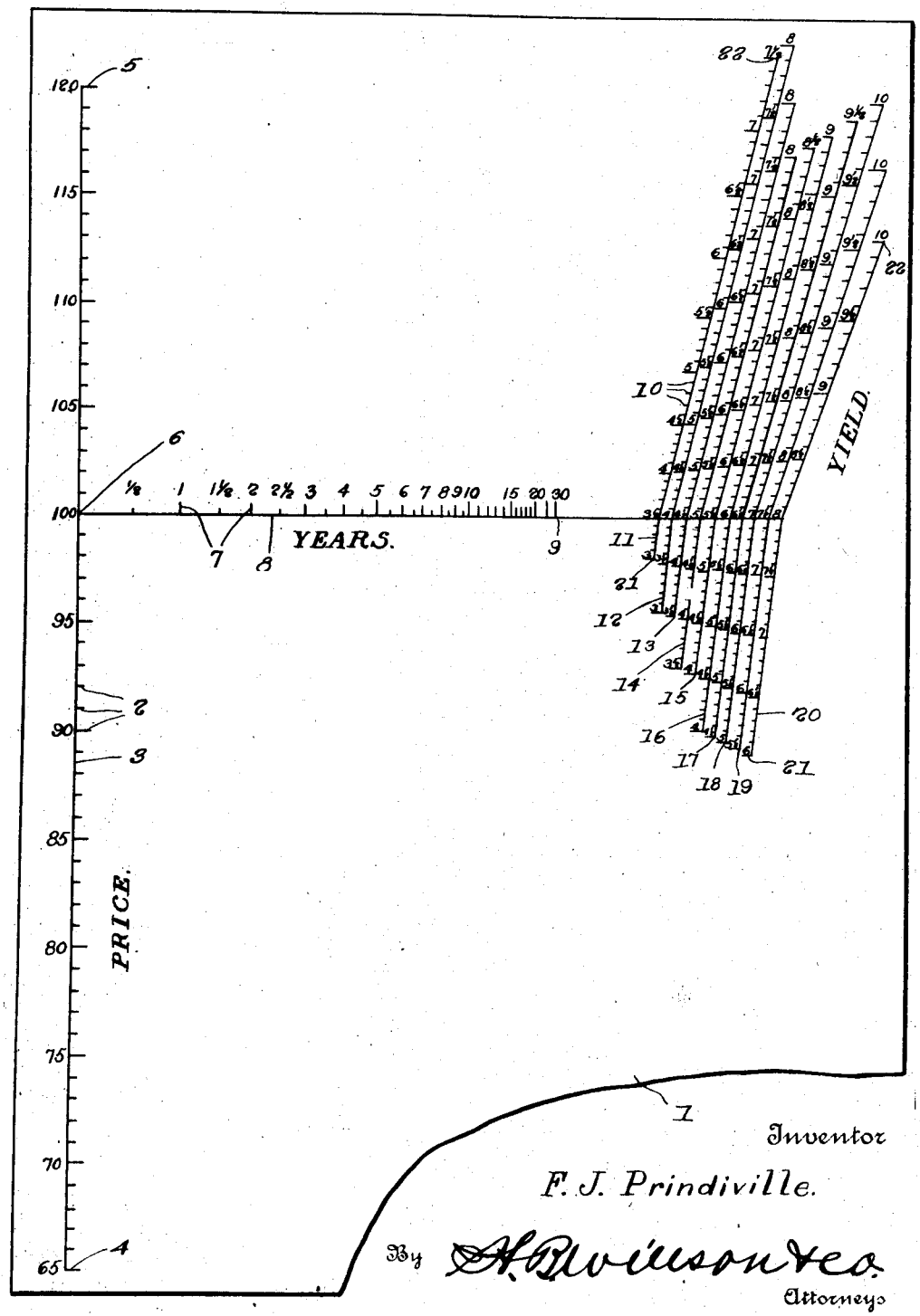
Inventor
F. J. Prindiville.

Patented Apr. 29, 1924.

1,492,046

UNITED STATES PATENT OFFICE.

FRANK J. PRINDIVILLE, OF CHICAGO, ILLINOIS.

BOND-VALUE CHART.

Application filed April 11, 1922. Serial No. 551,636.

*To all whom it may concern:*

Be it known that I, FRANK J. PRINDIVILLE, a citizen of the United States, residing at Chicago, in the county of Cook and State of Illinois, have invented certain new and useful Improvements in Bond-Value Charts; and I do declare the following to be a full, clear, and exact description of the invention, such as will enable others skilled in the art to which it appertains to make and use the same.

This invention relates generally to graphic calculating devices or charts, and particularly to a chart by which the values and other factors pertaining to bonds and the like may be calculated when certain values and other factors are known.

Heretofore, it has been customary to calculate certain values or factors of bonds and the like, given or knowing other values or factors, by mathematical computation according to certain formulas, or by the use of certain tables. These methods have of course been accurate and have proved to be satisfactory except that in carrying them out, it has been necessary to do considerable work. The primary object of the present invention is to provide a simple chart by the use of which certain values or factors of bonds and the like may be quickly ascertained without mathematical computation and without the use of tables. The invention therefore provides another method by which certain values and factors of bonds or the like may be ascertained.

The invention consists of the novel features of construction and the combination and arrangement of parts as are hereinafter described in detail and claimed and which are illustrated conventionally in the accompanying drawings, but briefly stated the invention comprises a single sheet having inscribed upon its face three series of designators, each of which is arranged in prescribed order from a commencing designator to a terminal designator. One of these series of designators may be termed a price designator and one of the intermediate designators in this series represents par value, while the remaining designators in this series represents values above and below par. Another series of designators may be termed a series of term designators, while the remaining series of designators may be termed a series of interest yield designators. One of the intermediate interest yield designators represents a fixed rate of interest and the remaining interest yield designators represent interest yield values above and below the fixed rate of interest. The three series of designators are arranged at an angle to one another and the designators in any one series are located at prescribed points with respect to the designators of the other two series so that, given the value of factors in any two series of designators, the factor in the remaining series of designators may be approximately calculated by ascertaining the value of the designator in the series of designators in which the unknown factor is located which is crossed by a line extending through the designators in the other two series represented by the given factors.

A chart may be constructed in accordance with the present invention where only one series of interest yield designators are provided, but it is preferable to provide the chart with a plurality of series of interest yield designators so that the same chart may be use for calculating values and factors respecting bonds and the like paying different rates of interest.

The relation which exists between the above mentioned factors or values is mathematically expressed by the following well known equation:—

$$P = \frac{C(1+N)^n + N - C}{N(1+N)^n}$$

In this equation:—
P=the purchase or market price of the bond;
C=amount of each coupon.
N=net yield or semi-annual yield.
$n$=number of semi-annual interest periods.

In the accompanying drawing forming a part of this specification a preferred embodiment of the invention is illustrated. The drawing represents a face view of the chart and is intended to merely show it conventionally and is not intended to be an accurate reproduction of a chart adapted for actual use, although it is believed to be accurate in a great many respects.

A preferred form of the invention, such as that illustrated in the accompanying drawing may consist of a single sheet 1 of paper, cardboard, or the like. The sheet 1 may of course be of any size and shape, but it is by preference of rectangular shape and is of a convenient size, although from the nature of the case, it will be understood that the larger it is, the more accurate it will be.

Arranged vertically along the left hand edge of the sheet 1 is a series of price designators 2. These price designators 2 are arranged adjacent a vertical line 3 which may be called a price line and really form graduations for the price line 3. The series of designators 2 or graduations for the price line 3 are arranged in prescribed order from a commencing designator 4 to a terminal designator 5. The commencing designator 4, the terminal designator 5 and certain of the intermediate designators are given values, the commencing designator 4 being given the value 65, the terminal designator 5 being given the value 120, while the intermediate designators are given the values between 65 and 120. The intermediate designator 6 whose value is 100 represents par value. It therefore follows that the designators lying between the designators 5 and 6 represent values above par, while the designators lying between the designators 6 and 4 represent values below par.

Arranged horizontally upon the sheet 1 is a series of term designators 7. These designators 7 follow a straight line 8, which preferably although not necessarily, extends to the right from the line 3 and at right angles to the latter and which intersects the line 3 at the designator 6 representing par value. The term designators are arranged in prescribed and numerical order from a commencing designator to a terminal designator. The commencing designator coincides with the par value designator 6 of the price series 2 and is also represented by the numeral 6. The terminal term designator is, however, represented by the numeral 9. The value of the commencing term designator 6 is zero, the value of the terminal term designator 9 is shown in the drawing as being 30, and certain of the intermediate term designators 7 are given numbers ranging from zero to 30.

Arranged at the right-hand side of the sheet 1 and crossing the line 8 at points to the right of the terminal designator 9 of the series of term designators is a plurality of series of interest yield designators 10. In the drawing ten series of interest yield designators 10 are shown, and these from left to right follow the lines 11, 12, 13, 14, 15, 16, 17, 18, 19 and 20 which may be termed interest yield lines, so that the designators 10 really form graduations in their respective interest yield lines.

The designators of each series of interest yield designators 10 are arranged in prescribed order from a commencing designator 21 to a terminal designator 22. The intermediate interest yield designator of each series at the intersection of its interest yield line by the line 8 represents a fixed rate of interest and is given a value corresponding with that rate of interest, and the designators above and below this particular intermediate designator of each series are given values respectively above and below the fixed rate of interest. Thus, the ten series of interest yield designators or the ten interest yield lines 11 to 20 inclusive may represent respectively interest yield series of designators or interest yield lines for bonds and the like paying three and one-half, four, four and one-half, five, five and one-half, six, six and one-half, seven, seven and one-half, and eight per cent interest. The designators of each series above and below the one which represents the fixed rate of interest are given numerals to represent certain prescribed values respectively above and below the fixed rate of interest.

The location of the designators in the three different series bear a definite predetermined or prescribed relation to one another. In reality, one set of designators bears a definite predetermined or prescribed relation to the other two sets, so that any two sets of designators may be arranged and marked arbitrarily before the third set is arranged and marked. For instance, the price line 3 and the term line 8 may be arranged arbitrarily at an angle to each other and these lines may be graduated arbitrarily irrespective of each other. The lines 11 to 20, inclusive, should then be arranged on the sheet, and after this has been done the graduations for these lines 11 to 20 inclusive, should be marked thereon at certain definite locations having relation to the graduations for the lines 3 and 8. This may be done by drawing several straight lines through certain of the designators 2 and 7 and marking the places where such straight lines cross the lines 11 to 20 inclusive. Knowing the values of the designators 2 and 7 through which the straight lines are drawn, the values of the designators 10 in the lines 11 to 20 inclusive, crossed by the straight lines may be ascertained by using one of the well known published tables or by substituting the known values in the above mentioned equation and solving the equation. After the interest yield values have been ascertained in this way, the proper numerals should be applied to the designators 10. Each of the lines 11 to 20 inclusive should be marked in this way with several known values, and then the remaining values in these lines can be marked and indicated by performing merely a drafting process.

In order that the use and nature of the different sets of lines and designators may be indicated upon the sheet 1, the latter is provided with legends located adjacent the different sets of lines and designators. For instance, the word "Price" is placed upon the sheet adjacent the designator 2 and the line 3, the word "Years" is placed upon the sheet adjacent the designators 7 and line 8, and the word "Yield" is placed upon the sheet adjacent the designators 10 and the lines 11 to 20 inclusive.

As briefly explained in the introductory part of this specification, the chart is used to calculate or ascertain one value or factor pertaining to a bond or the like when the other values or factors are known. For instance, if the purchase price of a bond is known, and the rate of interest which the bond pays and the time within which it is due to mature is known, the interest yield for it can be easily ascertained by placing a straight edge across the sheet through the known value in the price line 3 and the known designator in the term line 8 and reading the value of the designator crossed by the straight edge upon the line representing the rate of interest which the bond pays.

As an example, if a 5% ten-year bond for $100 was purchased below par for $84.50 and the interest yield of the bond is desired, a straight edge should be placed across the sheet so that it will cross the line 3 at 84½ and across the line 8 at 10. The answer 7.2 per cent can then be read upon the 5% line 14 at the point where the straight edge crosses that line. If other factors besides the interest yield of a bond or the like is desired, then the chart of course can be used in a reverse manner.

From the foregoing description taken in connection with the accompanying drawing, the construction and use of the invention may be readily understood without further description.

It is obvious that numerous changes in form, proportion and in the various details of construction may be resorted to without departing from the spirit and principle of the invention, and hence it is to be understood that such may be done within the meaning and scope of the appended claims.

I claim:

1. A graphic calculating device for bonds and the like comprising a sheet having inscribed on its face a series of price designators arranged in prescribed order from a commencing designator to a terminal designator, one of the intermediate price designators representing par value and the other price designators representing values above and below par, a series of term designators arranged in prescribed order from a commencing designator to a terminal designator and disposed at an angle to said series of price designators, the commencing designator of said series of term designators coinciding with the par value designator of said series of price designators, and a series of interest yield designators arranged in prescribed order from a commencing designator to a terminal designator and disposed at an angle to said series of term designators, one of the intermediate interest yield designators being in line with said series of term designators and representing a fixed rate of interest and the remaining interest yield designators representing interest yield values above and below the fixed rate of interest and being located at prescribed points with respect to said series of price designators and said series of term designators; whereby, given the value of factors in any two series of designators, the factor in the remaining series of designators may be approximately calculated by ascertaining the value of the designator in the series of designators in which the unknown factor is located which is crossed by a line extending through the designators in the other series represented by the given factors.

2. A graphic calculating device for bonds and the like comprising a sheet having inscribed on its face a series of price designators arranged in prescribed order from a commencing designator to a terminal designator, one of the intermediate price designators representing par value and the other price designators representing values above and below par, a series of term designators arranged in prescribed order from a commencing designator to a terminal designator and disposed at an angle to said series of price designators, the commencing designator of said series of term designators coinciding with the par value designator of said series of price designators, and a plurality of series of interest yield designators arranged in prescribed order from commencing designators to terminal designators and disposed at angles to said series of term designators, one of the intermediate designators of each series of interest yield designators being in line with said series of term designators and representing a fixed rate of interest and the remaining interest yield designators in that series representing interest yield values above and below the fixed rate of interest and being located at prescribed points with respect to said series of price designators and said series of term designators, said plurality of series of interest yield designators representing different fixed rates of interest; whereby, given the value of factors in any two series of designators, the factor in a remaining series of designators may be approximately calculated by ascertaining the value of the designator in the series of designators in which the unknown factor is located which is crossed by a line extending through the designators in the other series represented by the given factors.

3. A graphic calculating device for bonds and the like comprising a sheet having inscribed on its face a price line graduated in prescribed order from a commencing designator to a terminal designator, one of the intermediate designators of the price line representing par value and the other designators of the price line representing values above and below par, a term line graduated with designators arranged in a prescribed order from a commencing designator to a terminal designator and disposed at right angles to said price line, the commencing designator of said series of term designators coinciding with the par value designator of said series of price designators, and a plurality of interest yield lines graduated by designators arranged in prescribed order from a commencing designator to a terminal designator and disposed at angles to said term line, one of the intermediate designators of each interest yield line crossing said term line and representing a fixed rate of interest and the remaining designators of each interest yield line representing interest yield values above and below the fixed rate of interest and being located at prescribed points with respect to the designators of said price line and the designators of said term line, the plurality of interest yield lines representing different fixed rates of interest for which bonds are issued; whereby, given the value of factors in any two series of designators, the factor in a remaining series of designators may be approximately calculated by ascertaining the value of the designator in the series of designators in which the unknown factor is located which is crossed by a line extending through the designators in the other series represented by the given factors.

In testimony whereof I have hereunto set my hand.

FRANK J. PRINDIVILLE.